United States Patent
McConnell

(10) Patent No.: US 8,816,570 B1
(45) Date of Patent: Aug. 26, 2014

(54) DUAL CANTILEVER BEAM RELAXOR-BASED PIEZOELECTRIC SINGLE CRYSTAL ACCELEROMETER

(75) Inventor: James A. McConnell, Clinton, CT (US)

(73) Assignee: Applied Physical Sciences Corp., Groton, CT (US)

( * ) Notice: Subject to any disclaimer, the term of this patent is extended or adjusted under 35 U.S.C. 154(b) by 373 days.

(21) Appl. No.: 13/169,332

(22) Filed: Jun. 27, 2011

Related U.S. Application Data

(60) Provisional application No. 61/378,485, filed on Aug. 31, 2010.

(51) Int. Cl.
*H01L 41/04* (2006.01)
*H01L 41/187* (2006.01)

(52) U.S. Cl.
USPC ............ 310/340; 310/331; 310/332; 310/358

(58) Field of Classification Search
USPC ......... 310/328, 330, 331, 340, 358, 359, 370; 252/62.9 PZ
See application file for complete search history.

(56) References Cited

U.S. PATENT DOCUMENTS

| | | | |
|---|---|---|---|
| 3,403,103 A * | 9/1968 | Masamitsu et al. | 252/62.9 PZ |
| 3,622,815 A * | 11/1971 | Schafft | 310/332 |
| 6,370,084 B1 * | 4/2002 | Cray | 367/141 |
| 7,056,443 B2 * | 6/2006 | Sasaki et al. | 216/18 |
| 7,264,744 B2 * | 9/2007 | Nanao et al. | 252/62.9 PZ |
| 2007/0119259 A1 * | 5/2007 | Zou et al. | 73/777 |
| 2008/0072677 A1 * | 3/2008 | Rhee et al. | 73/652 |
| 2010/0237745 A1 * | 9/2010 | Shibata et al. | 310/330 |
| 2011/0013300 A1 * | 1/2011 | Wu | 359/849 |
| 2011/0017937 A1 * | 1/2011 | Luo et al. | 252/62.9 R |

* cited by examiner

*Primary Examiner* — Thomas Dougherty
(74) *Attorney, Agent, or Firm* — Ryan, Mason & Lewis, LLP

(57) ABSTRACT

A dual cantilever beam relaxor-based piezoelectric single crystal accelerometer is provided. A flexural sensing structure is provided that employs at least two piezoelectric cantilever beams having their longitudinal axes disposed in a substantially parallel arrangement with each beam containing at least one relaxor-based single crystal transduction element having its polarization axis substantially perpendicular to the longitudinal axis of the beam. One end is mounted to a rigid base and the other end can be mounted to a seismic proof-mass or can be free, wherein the base is subjected to dynamic excitation from either mechanical or acoustical origin. The flexible sensing structure can optionally be encapsulated in a viscoelastic material having a mechanical compliance and loss that is substantially greater than that of the flexible sensing structure.

10 Claims, 1 Drawing Sheet

DUAL CANTILEVER BEAM RELAXOR-BASED PIEZOELECTRIC SINGLE CRYSTAL ACCELEROMETER

CROSS-REFERENCE TO RELATED APPLICATIONS

The present application claims priority to U.S. Provisional Application Ser. No. 61/378,485, filed Aug. 31, 2010, incorporated by reference herein.

GOVERNMENT INTEREST

The present invention was made in connection with work performed under United States Navy Office of Naval Research Contract N00014-07-M-0250 and N00014-09-C-0175.

FIELD OF THE INVENTION

The present invention relates generally to flexural mode accelerometers that employ relaxor-based piezoelectric single crystal transduction elements which are used in applications related to the measurement of structureborne and fluidborne sound.

BACKGROUND OF THE INVENTION

Piezoelectric accelerometers of various designs have been used for decades in connection with structureborne and fluidborne sound measurements. A broad set of applications where they have been used include vibration monitoring of machinery, shock evaluation of structures, seismic sensing, and underwater acoustic surveillance. When low frequency applications are considered (e.g., frequencies below 10 kHz) flexural mode accelerometers are often used because they have excellent performance characteristics and can be fabricated in a reasonably straightforward manner. High frequency applications are better served with compression and shear mode accelerometers because the resonance frequency of such devices is typically in the ultrasonic range and therefore facilitates a flat receiving sensitivity over a relatively large bandwidth. For a general discussion on the basic operating principles of accelerometers, refer to G. Gautschi, *Piezoelectric Sensorics: Force, Strain, Pressure, Acceleration, and Acoustic Emission Sensors, Materials and Amplifiers* (Springer, Berlin, 2006) pp. 167-197, incorporated by reference herein.

Historically speaking, the most pervasive flexural mode accelerometer design is the so-called trilaminar piezoelectric cantilever beam in which a sensing structure comprised of a fixed-free metal beam outfitted with a pair of piezoelectric plates is used to convert dynamic motion to an output voltage that can be processed and displayed to glean useful information about a measurement. Depending on the design, a proof-mass may optionally be included at the free end of the beam so that the operational bandwidth and sensitivity are tuned to specific values. Examples of devices that utilize cantilever beam accelerometers include those described in U.S. Pat. Nos. 2,722,614, 4,333,029, and 4,709,359, each incorporated by reference herein. In all cases it is important to note that the piezoelectric plates associated with these devices comprise a polycrystalline ceramic composition such as lead zirconate titanate (PZT) and a single composite cantilever beam is utilized.

In the late 1990s, researchers discovered that relaxor-based piezoelectric single crystal materials had superior elasto-piezo-dielectric properties relative to those of polycrystalline ceramics. These improved properties naturally led to devices exhibiting higher figure-of-merits relative to the same devices containing ceramic transduction elements. An example of such a transducer is disclosed in U.S. Pat. No. 7,104,140 B2, incorporated by reference herein, which considers a trilaminar cantilever beam accelerometer that exploits the transverse extension, or 3-1 mode of the piezoelectric material. Here it is noted that the figure-of-merit for a piezoelectric transducer is defined by C. H. Sherman and J. L. Butler, *Transducers and Arrays for Underwater Sound* (Springer, New York, 2007), pp. 156-157, incorporated by reference herein, as $M_o^2/|Z_e|$, where $M_o$ is the open-circuit voltage sensitivity and $Z_e$ is the electrical source impedance. Moreover, well below resonance where the transducer is in the stiffness-controlled region, the figure-of-merit can be expressed as $M_o^2 C^T$ when dielectric losses can be neglected and $M_o^2 C^T/\tan \delta$ when dielectric losses cannot be neglected. Here it is noted that $C^T$ and $\tan \delta$ are the free capacitance and dielectric loss of the transducer. Generally speaking, the figure-of-merit can be further expressed in terms of the piezoelectric constants such that $M_o^2 C^T \sim g_{ij} d_{ij}$, where $g_{ij}$ and $d_{ij}$ are the piezoelectric voltage and charge constants, respectively. When a comparison of piezoelectric constants is made between ceramic and single crystal material the figure-of-merit upgrade provided by single crystal, in the absence of dielectric losses, ranges from approximately 6 to 12 dB. This can be gleaned by reviewing the material properties delineated for ceramic and single crystal in C. H. Sherman and J. L. Butler, *Transducers and Arrays for Underwater Sound* (Springer, New York, 2007), pp. 552-553, incorporated by reference herein. Nevertheless, the figure-of-merit upgrade essentially translates into how much lower the electronic noise floor will be relative to an identical device made from ceramic transduction elements. In this way the single crystal device can detect quieter sounds than its ceramic counterpart and can lead to improved sensing capabilities.

Now, in some applications involving piezoelectric accelerometers for low frequency fluidborne sound measurements, the figure-of-merit upgrade single crystals provides is not enough to meet the electronic noise floor requirement of a sensing system. This can be the case even when the transducer is coupled to a high-performance low noise preamplifier containing junction field effect transistors, such as that described by P. Horowitz and W. Hill, *The Art of Electronics*, (Cambridge University Press, New York, 1998), $2^{nd}$ Ed., pp. 436-445, incorporated by reference herein. In these applications the sensitivity and/or capacitance of the accelerometer can be increased by the appropriate combination of additional sensing elements, and in doing so, the electronic noise floor can be reduced. For example, when higher sensitivity is required the sensing elements are electrically connected in series. Conversely, when higher capacitance is required the sensing elements are electrically connected in parallel. Moreover, series-parallel combinations can yield increases in both the sensitivity and capacitance.

Another method that can be used to increase the sensitivity is to position the fundamental resonance of the accelerometer as low as practically achievable. This approach is acceptable provided that the mechanical quality factor of the resonance is sufficiently low to preclude ringing, dynamic range limitations, mechanical cross-talk, and distorted directivity patterns. Here it is noted that the mechanical quality factor is inversely proportional to the resonance frequency and conforms to the well-known relation $Q_m = (\omega_0 R_m C_m)^{-1}$ where $\omega_0 = (M_m C_m)^{-1/2}$ is the resonance frequency and $M_m$, $C_m$, and $R_m$ are the mechanical mass, compliance, and damping, respectively. For a further discussion on the mechanical quality factor, see, e.g., C. H. Sherman and J. L. Butler, *Transducers and Arrays for Underwater Sound* (Springer, New York, 2007), pp. 81, 380-381, incorporated by reference herein. Moreover, the sensitivity of a piezoelectric accelerometer, well below resonance, is roughly proportional to the mechanical mass in the system or, $M_o = k^2 M_m/N$, which in turn is inversely proportional to the square of the resonance frequency. The variables k and N in the preceding equation are the electro-mechanical coupling coefficient and turns ratio. In this way, as the resonance frequency is lowered the mechanical mass increases which in turn raises the sensitivity. The theory behind this assertion is relatively well-known and is presented for the case of a flexural mode accelerometer in M. B. Moffett, D. H. Trivett, P. J. Klippel, and P. D. Baird, "A Piezoelectric, Flexural-Disk, Neutrally Buoyant, Underwater Accelerometer," *IEEE Transactions on Ultrasonics, Ferroelectrics, and Frequency Control*, Vol. 45, No. 5, 1341-1346 (1998), incorporated by reference herein. Nevertheless, the consequence of lowering the resonance frequency is that the mechanical quality factor increases. Damping treatments or other suitable means are required to mitigate the adverse effects of such a dynamic system.

To further illustrate some of the points in the preceding paragraphs, the electronic noise floor of a piezoelectric hydrophone that is coupled to a voltage-mode preamplifier can be roughly estimated from the incoherent sum of the individual noise components according to $P_n (E_n^2 + E_t^2 + E_i^2 + E_j^2)^{1/2}/M_o$, where $E_n$ is the preamplifier noise voltage, $E_t$ is the thermal noise associated with the transducer, $E_i$ is the preamplifier current noise flowing through the reactance associated with the transducer, and $E_j$ is the Johnson noise associated with the input resistance of the preamplifier. The parameters can be defined further as $E_t = (4k_B T \tan \delta/\omega C^T)^{1/2}$, $E_i = I_n \omega C^T$, and $E_j = (4k_B T R_i)^{1/2}/\omega R_i C^T$, where $k_B$ is Boltzman's constant, T is the absolute temperature, and $R_i$ is the input resistance of the preamplifier. It can be gleaned from the foregoing that the electronic noise floor, particularly at low frequencies can be minimized by maximizing the free capacitance $C^T$ and sensitivity $M_o$. Note that these formulae are valid for frequencies well below the resonance of the transducer and generally conform to the treatment given by T. B. Straw, "Noise Prediction for Hydrophone/Preamplifier Systems," Naval Undersea Warfare Center Division Newport Report No. 10369, dated Jun. 3, 1993 (DTIC Report No. ADA265915), incorporated by reference herein. It is further noted that these equations are valid whether the hydrophone is sensitive to the acoustic pressure or the acoustic pressure-gradient, with the latter embodiment corresponding to the use of an accelerometer as the principal sensing component.

With regard to relaxor-based single crystal materials, binary and ternary formulations can be utilized for the transduction elements. Here it is noted that binary formulations can be comprised of, for example, lead magnesium niobate-lead titanate (PMN-PT) and lead zinc niobate-lead titanate (PZN-PT). Ternary formulations can be comprised of, for example, lead magnesium niobate-lead indium niobate-lead titanate (PMN-PIN-PT) and lead magnesium niobate-lead zirconate-lead titanate (PMN-PZ-PT). The motivation for developing ternary compounds was to improve the performance of the material with respect to temperature since it is relatively well known that the properties of single crystal materials can be compromised when they are subjected to moderate temperatures. For a discussion regarding the temperature characteristics associated with binary and ternary single crystal materials, see, for example, U.S. Pat. Publication No. 20090194732 A1 and C. H. Sherman and J. L. Butler, *Transducers and Arrays for Underwater Sound* (Springer, New York, 2007), pp. 552-553, each incorporated by reference herein.

SUMMARY OF THE INVENTION

Generally, a dual cantilever beam relaxor-based single crystal accelerometer is provided comprising a novel flexible sensing structure that employs two trilaminar piezoelectric cantilever beams having their longitudinal axes disposed in a parallel arrangement. The beams have a common base and optionally share a seismic proof-mass. The accelerometer exhibits high capacitance by virtue of electrically connecting four relaxor-based single crystal elements in parallel. The piezoelectric elements therefore serve as one electrode for the accelerometer. The metal beams to which the piezoelectric elements are attached are also electrically connected in parallel and serve as the other electrode. Note that pursuant to the description of the present invention, the term parallel has a different meaning when it is used to describe the geometry of the sensing structure as opposed to the method of electrically connecting the piezoelectric elements. Moreover, the accelerometer exhibits high sensitivity by virtue of using relaxor-based single crystal elements and having a low resonance frequency. The mechanical quality factor of the resonance is maintained within acceptable limits by encapsulating the entire sensing structure in an elastomeric material such as silicone or polyurethane. Here it is noted that the elastomeric material has high mechanical compliance and loss relative to the flexible sensing structure. Materials having a gel-like consistency have been found to exhibit these attributes and work extremely well in these applications.

According to one aspect of the invention, a flexural sensing structure is provided that employs at least two piezoelectric cantilever beams having their longitudinal axes disposed in a substantially parallel arrangement with each beam containing at least one relaxor-based single crystal transduction element having its polarization axis substantially perpendicular to the longitudinal axis of the beam.

In one exemplary embodiment, one end can be mounted to a rigid base and the other end can be mounted to a seismic proof-mass, wherein the base is subjected to dynamic excitation from either mechanical or acoustical origin. In a further variation, one end can be mounted to a rigid base and the other end can be free, wherein the base is subjected to dynamic excitation from either mechanical or acoustical origin.

The flexible sensing structure can optionally be encapsulated in a viscoelastic material having a mechanical compliance and loss that is substantially greater than that of the flexible sensing structure.

The relaxor-based piezoelectric single crystal transduction elements can optionally comprise a binary formulation, such as <001> poled PMN-PT, <011> poled PMN-PT, <110> poled PMN-PT, <001> poled PZN-PT, <011> poled PZN-PT, or <110> poled PZN-PT.

The relaxor-based piezoelectric single crystal transduction elements can optionally comprise a ternary formulation, such as <001> poled PMN-PIN-PT, <011> poled PMN-PIN-PT, <110> poled PMN-PIN-PT, <001> poled PZN-PZ-PT, <011> poled PZN-PZ-PT, or <110> poled PZN-PZ-PT.

The damping treatment is an important feature and provides vibration attenuation in two basic ways. First, the elastomeric material contained in the space between the cantilever beams essentially serves as a constrained layer damper that deforms to a large extent in shear and is very effective in mitigating flexural vibration of mechanical structures. Second, the elastomeric material contained everywhere else except the space between the beams serves as a distributed damper wherein flexural vibration is mitigated by virtue of dissipating energy through elastic wave propagation in a relatively large volume of lossy material which is mechanically grounded to the base to which the cantilever beams are attached. The volume of the distributed damper is selected to be sufficiently large so that a continuous system representation of the material with losses more or less dictates the manner in which the elastic waves propagate and dissipate. Both of these methods are superior to extensional (i.e., free layer) damping treatments which involve applying a relatively thin layer of damping material to a mechanical structure undergoing flexural vibration. For more information on viscoelastic damping treatments and viscoelastic materials consult A. D. Nashif, D. I. G. Jones, and J. P. Henderson, *Vibration Damping* (John Wiley and Sons, Inc., New York, 1985), pp. 196, 263-274, and 278-290, H. Kolsky, *Stress Waves in Solids* (Dover Publications, Inc., New York, 1963), pp. 116-122, and R. N. Capps, "Elastomeric Materials for Acoustical Applications," Naval Research Laboratory Orlando Fla., Underwater Sound Reference Detachment, dated Sep. 15, 1989 (DTIC Report No. ADA216872), each incorporated by reference herein.

During operation, the base to which the beams are attached is subjected to dynamic motion as a result of an external force as in the case of mechanical excitation or the pressure-gradient as in the case of acoustical excitation. The resulting motion of the base causes the sensing structure to deform in flexure which subjects the piezoelectric elements to compressive and tensile stresses that are to a large extent directed along the longitudinal axes of the beam. The action of stressing the piezoelectric elements produces an open-circuit output voltage that is proportional to acceleration of the base.

A more complete understanding of the present invention, as well as further features and advantages of the present invention, will be obtained by reference to the following detailed description and drawings.

DETAILED DESCRIPTION

Figure 1:
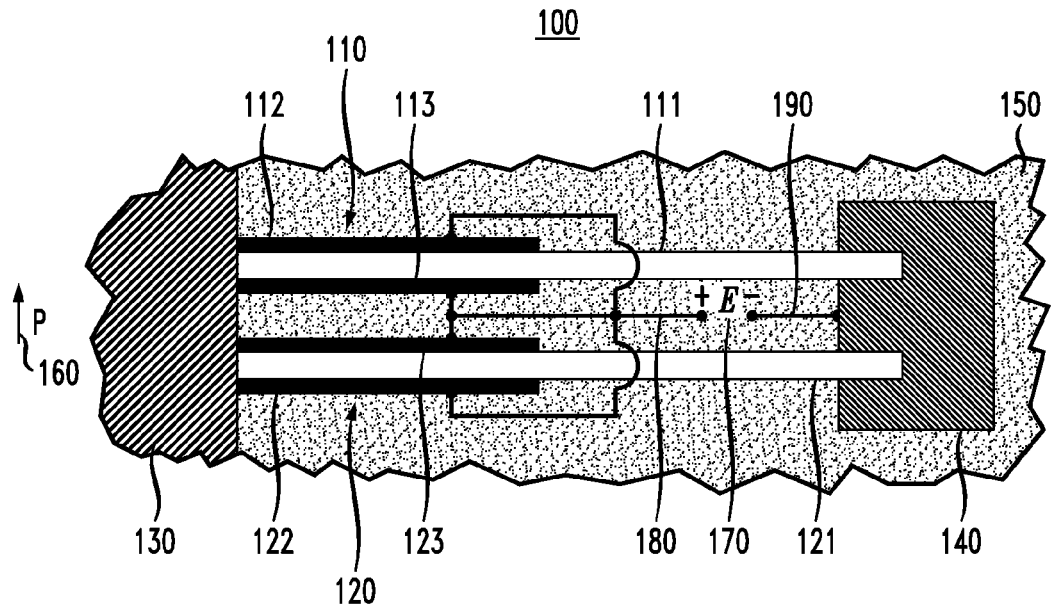
FIG. 1 presents an elevation section drawing showing a first embodiment of a dual-cantilever beam accelerometer that is representative of the present invention.

FIG. 1 presents an elevation section drawing showing a first embodiment of a dual-cantilever beam accelerometer 100 that is representative of the present invention. The figure shows that two trilaminar sensing structures 110 and 120 are fixed at one end to base 130 and free at the other end wherein proof-mass 140 is attached. Said sensing structures are arranged so that their longitudinal axes are substantially parallel and are encapsulated in viscoelastic material 150 whose mechanical compliance and losses are significantly greater than those of the sensing structure. The main purpose of viscoelastic material 150 is to provide a sufficient level of damping to maintain the mechanical quality factor associated with the sensing structure's fundamental resonance within acceptable limits. Each sensing structure comprises two metal beams 111 and 121 whose top and bottom surfaces are electrically connected to piezoelectric plates 112 and 113, and 122 and 123, respectively, using electrically conductive epoxy or some other suitable technique. Piezoelectric plates 112, 113, 122, and 123 are made from a relaxor-based single crystal material, employ metalized electrodes on their active surfaces, and have the same polarity as indicated by polarization vector 160. Dynamic forces or acceleration imparted to base 130 causes the sensing structure to exhibit transverse bending motion which generates open-circuit output voltage 170. Open-circuit output voltage 170 is measured across electrical leads 180 and 190. Electrical lead 180 is connected to piezoelectric plates 112, 113, 122, and 123 and electrical lead 190 is connected to proof-mass 140, which in turn is electrically connected to beams 111 and 121.

Figure 2:
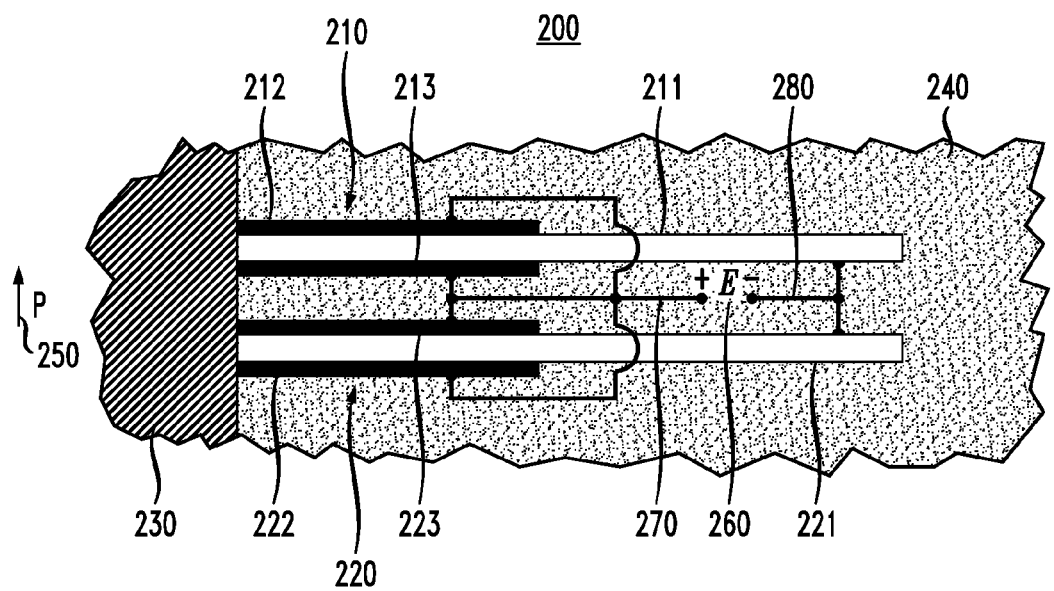
FIG. 2 presents an elevation section drawing showing a second embodiment of a dual-cantilever beam accelerometer that is representative of the present invention.

FIG. 2 presents an elevation section drawing showing a second embodiment of a dual-cantilever beam accelerometer 200 that is representative of the present invention. The figure shows that two trilaminar sensing structures 210 and 220 are fixed at one end to base 230 and free at the other end. Said sensing structures are arranged so that their longitudinal axes are substantially parallel and are encapsulated in viscoelastic material 240 whose mechanical compliance and losses are significantly greater than those of the sensing structure. The main purpose of viscoelastic material 240 is to provide a sufficient level of damping to maintain the mechanical quality factor associated with the sensing structure's fundamental resonance within acceptable limits Each sensing structure comprises two metal beams 211 and 221 whose top and bottom surfaces are electrically connected to piezoelectric plates 212 and 213, and 222 and 223, respectively, using electrically conductive epoxy or some other suitable technique. Piezoelectric plates 212, 213, 222, and 223 are made from a relaxor-based single crystal material, employ metalized electrodes on their active surfaces, and have the same polarity as indicated by polarization vector 250. Dynamic forces or acceleration imparted to base 230 causes the sensing structure to exhibit transverse bending motion which generates open-circuit output voltage 260. Open-circuit output voltage 260 is measured across electrical leads 270 and 280. Electrical lead 270 is connected to piezoelectric plates 112, 113, 122, and 123 and electrical lead 280 is connected to metal beams 211 and 221.

For additional details on parallel beam structures in connection with a piezoelectric accelerometer, see, for example, U.S. Pat. Nos. 4,479,385, 5,677,487, and 5,996,412, each incorporated by reference herein. It is noted that the transduction mechanism covered in these patents is different than what is employed by the present invention. For example, in all cases, the prior art considers an inverted trilaminar sensing structure comprised of a piezoelectric element that is sandwiched between two metal beams whose longitudinal axes are substantially parallel. Moreover, in the prior art, the deformation of the piezoelectric element is predominantly in transverse shear which exploits the 1-5 mode of the piezoelectric material. The present invention greatly differs from this embodiment because the piezoelectric elements are not sandwiched between a pair of metal beams and deform to a large extent in transverse extension which exploits the 3-1 mode of the piezoelectric material. For more information that relates the mechanical deformation and subsequent electrical output of piezoelectric elements configured for 3-1 mode and 1-5 mode operation consult, see, e.g., W. P. Mason, *Physical Acoustics—Principles and Methods, Volume I—Part A, Methods and Devices* (Academic Press, New York, 1964), pp. 233-242, incorporated by reference herein.

It is to be understood that the embodiments and variations shown and described herein are merely illustrative of the principles of this invention and that various modifications may be implemented by those skilled in the art without departing from the scope and spirit of the invention.

I claim:

1. A flexural sensing structure that employs at least two trilaminar piezoelectric cantilever beams having their longitudinal axes disposed in a substantially parallel arrangement with each beam comprising a relaxor-based single crystal transduction element on each side of a metal beam structure, said relaxor-based single crystal transduction elements having their polarization axis substantially perpendicular to the longitudinal axis of the beam, wherein said at least two trilaminar piezoelectric cantilever beams are covered by a viscoelastic material.

2. The flexible sensing structure of claim 1, having one end mounted to a rigid base and the other end mounted to a seismic proof-mass wherein said base is subjected to dynamic excitation from either mechanical or acoustical origin.

3. The flexible sensing structure of claim 1, encapsulated in a viscoelastic material having a mechanical compliance and loss that is substantially greater than that of the flexible sensing structure.

4. The flexible sensing structure of claim 1, having one end mounted to a rigid base and the other end free wherein said base is subjected to dynamic excitation from either mechanical or acoustical origin.

5. The flexible sensing structure of claim 1, wherein the relaxor-based piezoelectric single crystal transduction elements comprise a binary formulation.

6. The flexible sensing structure of claim 5, wherein the binary formulation comprises one or more of <001> poled PMN-PT, <011> poled PMN-PT, or <110> poled PMN-PT.

7. The flexible sensing structure of claim 5, wherein the binary formulation comprises one or more of <001> poled PZN-PT, <011> poled PZN-PT, or <110> poled PZN-PT.

8. The flexible sensing structure of claim 1, wherein the relaxor-based piezoelectric single crystal transduction elements comprise a ternary formulation.

9. The flexible sensing structure of claim 8, wherein the ternary formulation comprises one or more of <001> poled PMN-PIN-PT, <011> poled PMN-PIN-PT, or <110> poled PMN-PIN-PT.

10. The flexible sensing structure of claim 8, wherein the ternary formulation comprises one or more of <001> poled PZN-PZ-PT, <011> poled PZN-PZ-PT, or <110> poled PZN-PZ-PT.

* * * * *

UNITED STATES PATENT AND TRADEMARK OFFICE
CERTIFICATE OF CORRECTION

PATENT NO.        : 8,816,570 B1                                  Page 1 of 1
APPLICATION NO.   : 13/169332
DATED             : August 26, 2014
INVENTOR(S)       : James A. McConnell It is certified that error appears in the above-identified patent and that said Letters Patent is hereby corrected as shown below:

In the specification

Column 2, line 25, replace "crystal material the" with --crystal material, the--.

Column 4, line 18, replace "Note that pursuant" with --Note that, pursuant--.

Column 6, lines 37 and 38, replace "112, 113, 122 and 123" with --212, 213, 222 and 223--.

Signed and Sealed this
Twenty-ninth Day of March, 2016

Michelle K. Lee
*Director of the United States Patent and Trademark Office*